(12) United States Patent
Xiao et al.

(10) Patent No.: US 9,099,855 B2
(45) Date of Patent: Aug. 4, 2015

(54) SCREW RETAINING MECHANISM AND PV JUNCTION BOX ASSEMBLED WITH THE SCREW RETAINING MECHANISM

(71) Applicant: HON HAI PRECISION INDUSTRY CO., LTD., New Taipei (TW)

(72) Inventors: Xue-Yuan Xiao, Kunshan (CN); Zhang-Lan Xue, Kunshan (CN); Zi-Qiang Zhu, Kunshan (CN)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 133 days.

(21) Appl. No.: 14/029,816

(22) Filed: Sep. 18, 2013

(65) Prior Publication Data

US 2014/0076603 A1  Mar. 20, 2014

(30) Foreign Application Priority Data

Sep. 18, 2012 (CN) ...................... 2012 2 0474138 U

(51) Int. Cl.
*H02G 3/16* (2006.01)
*H02G 3/06* (2006.01)
*H02G 3/08* (2006.01)

(52) U.S. Cl.
CPC .............. *H02G 3/16* (2013.01); *H02G 3/0675* (2013.01); *H02G 3/083* (2013.01); *H02G 3/088* (2013.01); *Y10T 403/67* (2015.01)

(58) Field of Classification Search
CPC ............. H02G 3/00; H02G 3/02; H02G 3/04; H02G 3/06; H02G 3/0616; H02G 3/0625; H02G 3/0658; H02G 3/30; H02G 3/32; H02G 3/083; H02G 3/16; H02G 3/18; H02G 3/0675; H02G 3/088; H01R 4/28; H01R 4/30; Y10T 403/67; Y10T 403/7062
USPC .............. 174/50, 520, 559, 59, 60, 650, 652, 174/653, 655, 660, 665, 138 F, 360; 439/76.1, 76.2, 949, 439, 437, 438, 439/719, 720; 361/600, 601, 641, 724, 756, 361/823, 827; 403/342, 343
See application file for complete search history.

(56) References Cited

U.S. PATENT DOCUMENTS

| | | | |
|---|---|---|---|
| 4,250,348 A * | 2/1981 | Kitagawa | 174/655 |
| 7,763,807 B2 * | 7/2010 | Richter | 174/138 F |
| 7,914,298 B2 * | 3/2011 | Lauermann et al. | 439/76.1 |
| 7,960,650 B2 * | 6/2011 | Richter et al. | 174/50 |
| 8,097,818 B2 * | 1/2012 | Gerull et al. | 174/59 |
| 8,106,313 B2 * | 1/2012 | Tremaine | 174/653 |
| 8,841,562 B2 * | 9/2014 | Drotleff et al. | 174/360 |

* cited by examiner

*Primary Examiner* — Angel R Estrada
(74) *Attorney, Agent, or Firm* — Wei Te Chung; Ming Chieh Chang

(57) ABSTRACT

A screw retaining mechanism includes a hollow stud and a nut is matched with the hollow stud. The hollow stud has a plurality of elastic plates extending from a free end thereof and along a peripheral wall thereof. An opening is located between two adjacent elastic plates. An inner wall of the nut has a plurality of tubers protruding in the axial direction to match into the opening. The elastic plate defines a first side face and a second side face opposite to the first side face. Said first side face is used to guide the tubers into the opening and the second side face prevent the tuber fall off from the stud.

20 Claims, 6 Drawing Sheets

SCREW RETAINING MECHANISM AND PV JUNCTION BOX ASSEMBLED WITH THE SCREW RETAINING MECHANISM

BACKGROUND OF THE INVENTION

1. Field of the Invention

The present invention generally relates to a screw retaining mechanism and more particularly to a junction box with a screw retaining mechanism.

2. Description of Related Art

A junction box with a screw retaining mechanism is disclosed in U.S. Pat. No. 7,914,298 B2 issued to LAUERMANN et al. on Apr. 15, 2010. Said junction box includes a box and a screw retaining mechanism, the screw retaining mechanism is formed on a side wall of the box. Said screw retaining mechanism includes a hollow stud and a nut, the nut is configured to engage the hollow stud. However, said nut and stud will be aging as time goes on and causing the nut loose from the stud.

Hence, a screw retaining mechanism to prevent the flange fall off from the stud is desired.

SUMMARY OF THE INVENTION

The present invention provides a screw retaining mechanism, comprises a hollow stud having a plurality of elastic plates extending from a free end thereof and along a peripheral wall thereof, a nut matched with the hollow stud and an opening is located between two adjacent elastic plates, an inner wall of the nut has a plurality of tubers protruding inwardly and extending in an axial direction thereof to match with the opening, said elastic plate defines a first side face used to guide the tubers into the opening and a second side face opposite to said first side face abutting against the tubers such that the tubers could rotate over the first side face in a first direction along the peripheral wall but could not rotate over the second side face in a second reverse direction opposite to the first direction.

Other objects, advantages and novel features of the present invention will become more apparent from the following detailed description of the present embodiment when taken in conjunction with the accompanying drawings.

DETAILED DESCRIPTION OF THE INVENTION

Figure 1:
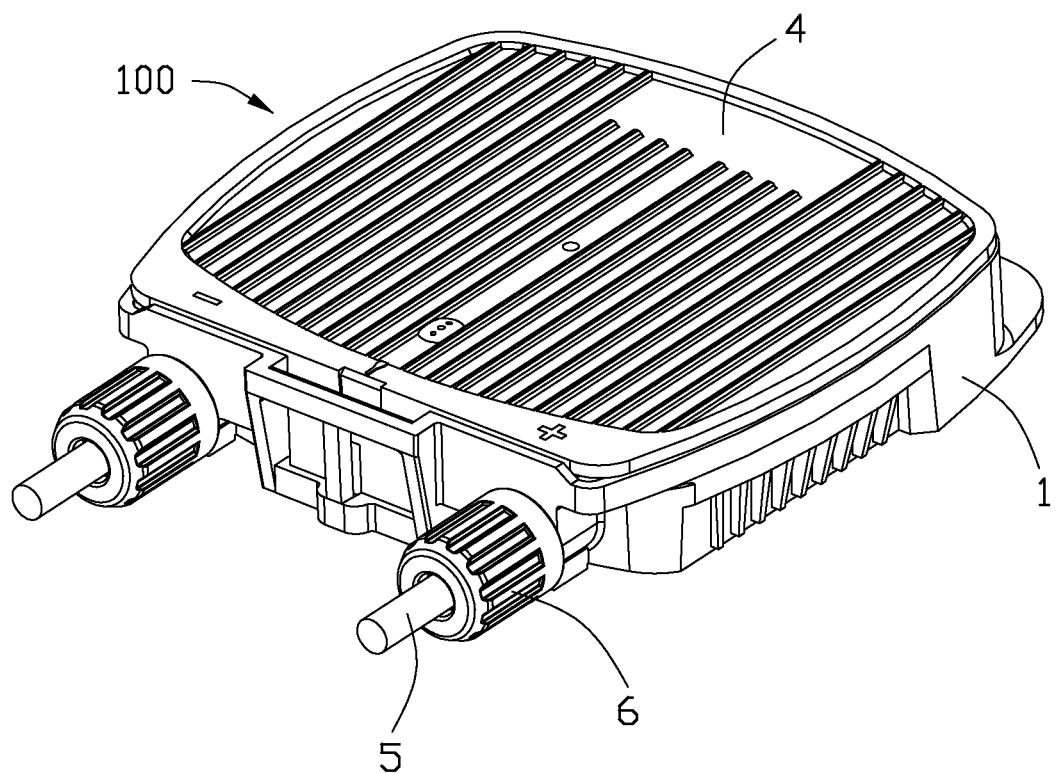
FIG. 1 is a perspective view of a PV junction of the present invention.

Reference will now be made to the drawing figures to describe the preferred embodiment of the present invention in detail.

Figure 2:
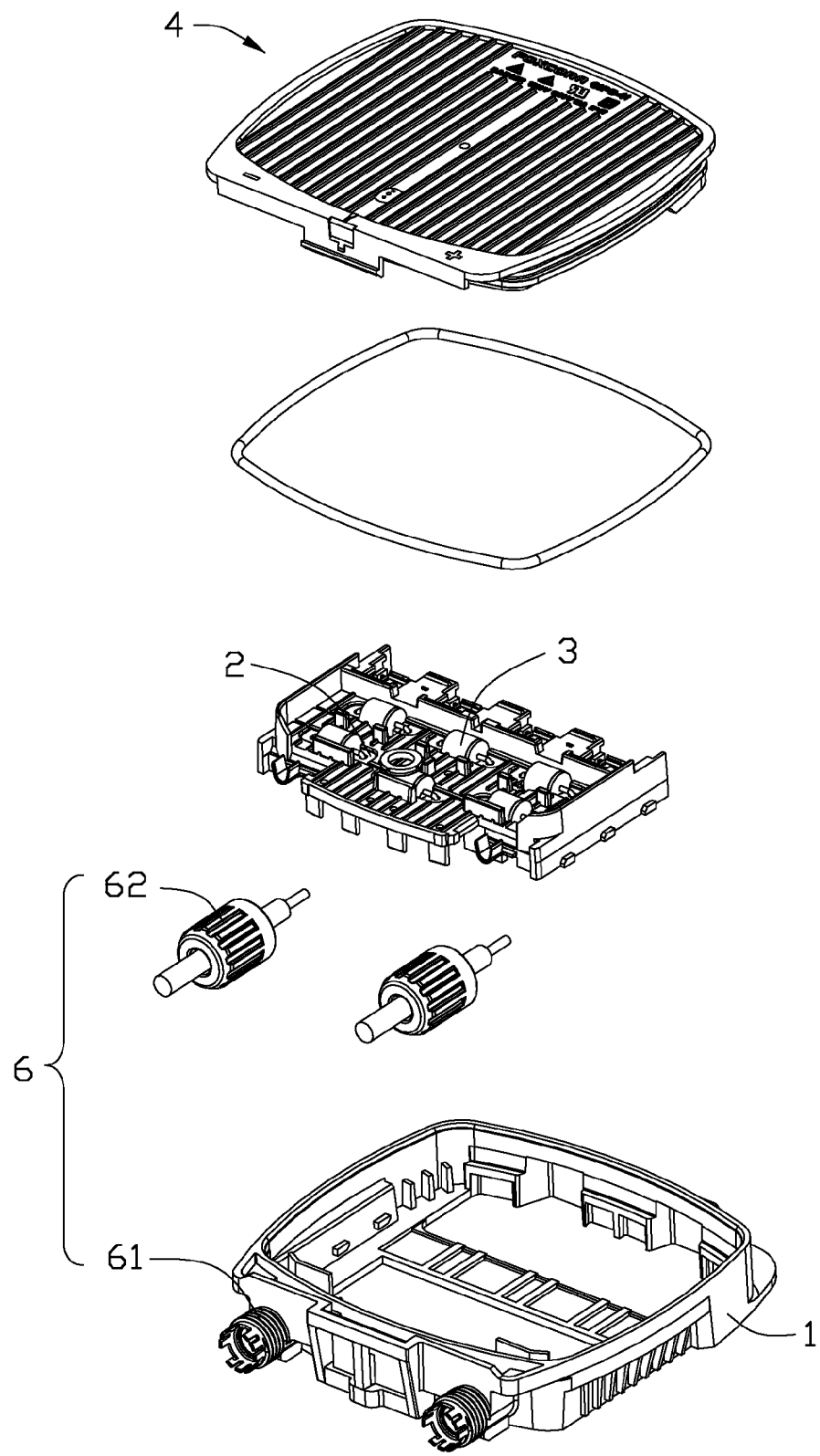
FIG. 2 is an exploded view of the PV junction box of FIG. 1.

Please referring to FIGS. 1-2, a PV (photovoltaic) junction box 100 used for electrically connecting a PV (photovoltaic) module (not shown) and transmitting electrical current according to the present invention is disclosed. The PV junction box includes box 1, a plurality of metal contacting foils 2 received in the box, a plurality of diodes 3 connecting with two neighbor contacting foils 2, a cover 4 covering an upper side of the box 1, and a cable 5 connecting with the box 1. The box 1 further includes a screw retaining mechanism 6, said cable 5 insert into the insulative box 1 through the screw retaining mechanism 6 and electrically connects with the contacting foils 2.

Figure 3:
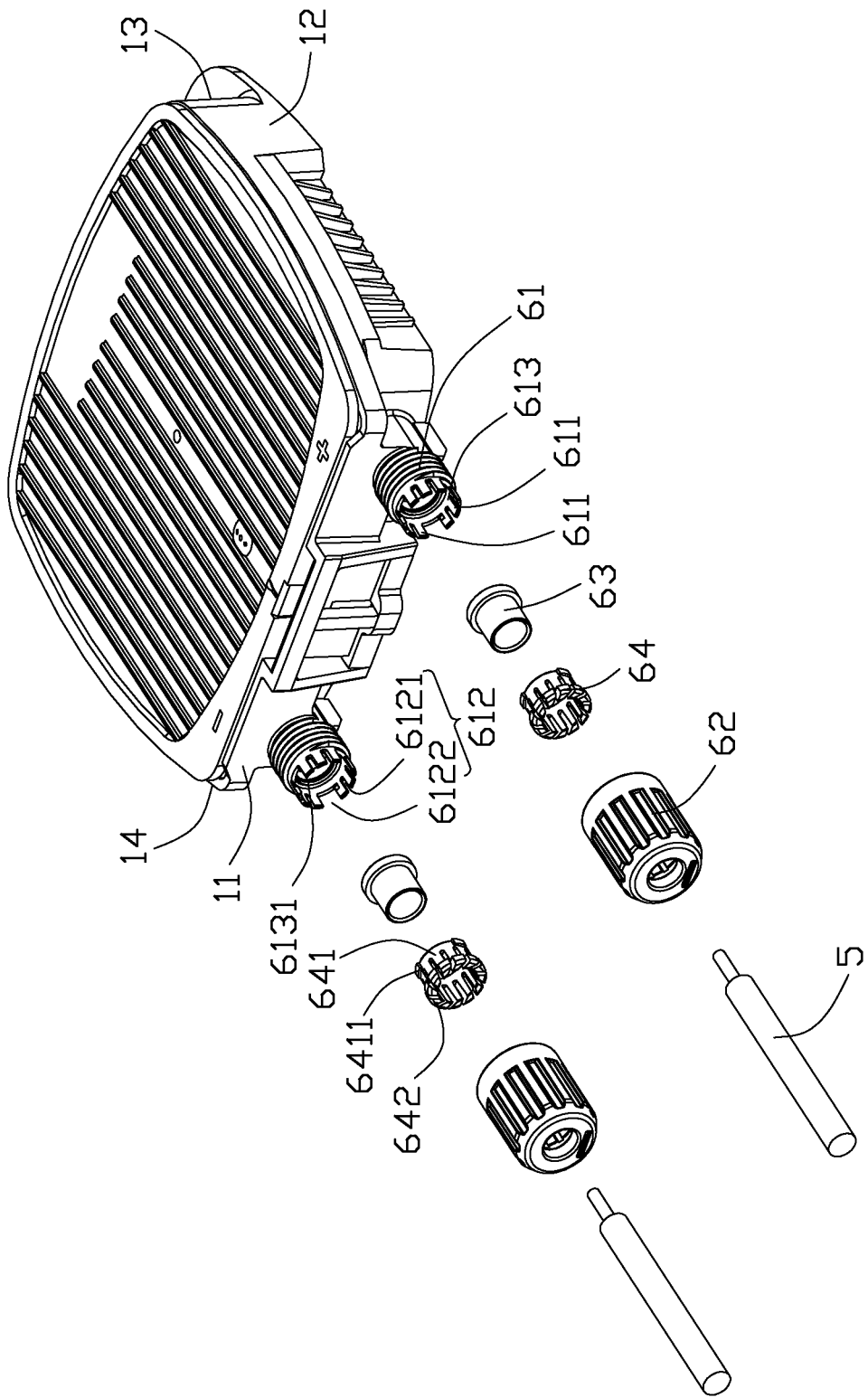
FIG. 3 is another exploded view of the PV junction box of FIG. 1.

Please referring to FIG. 3, the screw retaining mechanism 6 includes a hollow stud 61 and a nut 62 matched with the hollow stud 61, the box includes a bottom wall and four side walls 11, 12, 13, 14, the side wall 11 defines two side by side hollow stud 61 with exterior thread, from which the cable 5 extending through to connect with the contacting foils 2. Said hollow stud 61 defines a plurality of elastic plates 611 extending from a free end thereof and along a peripheral wall thereof, an opening 612 is located between two adjacent elastic plates 611.

Figure 4:
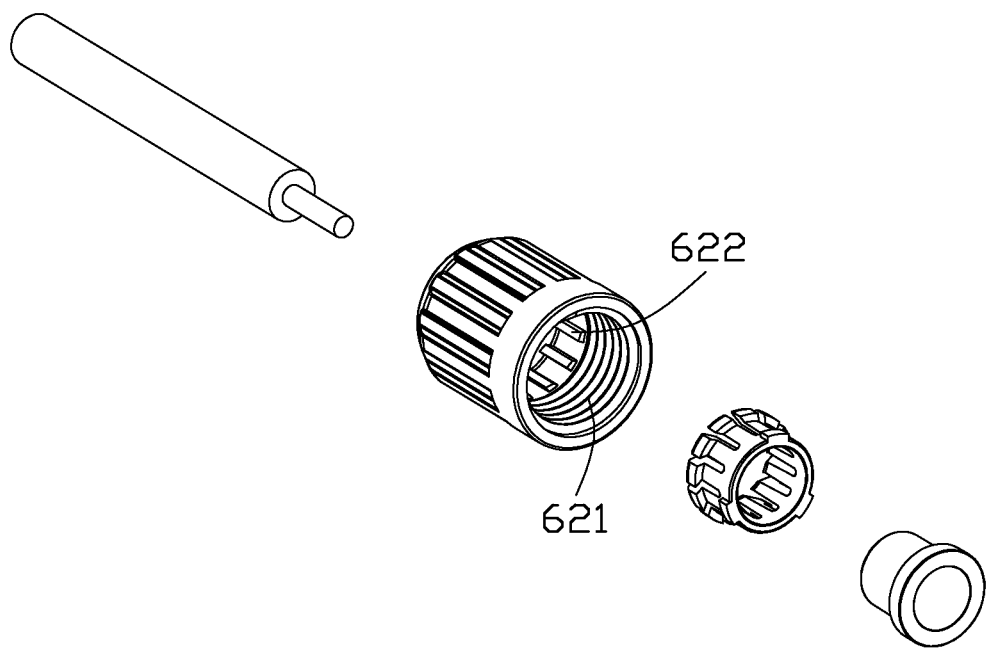
FIG. 4 is an exploded view of the screw retaining mechanism.

Please referring to FIG. 4, an inner wall 621 of the nut 62 has a plurality of tubers 622 protruding inwardly and extending in an axial direction thereof to match with the opening 612, said tuber 622 is formed adjacent to a bottom surface of the nut 62.

Figure 5:
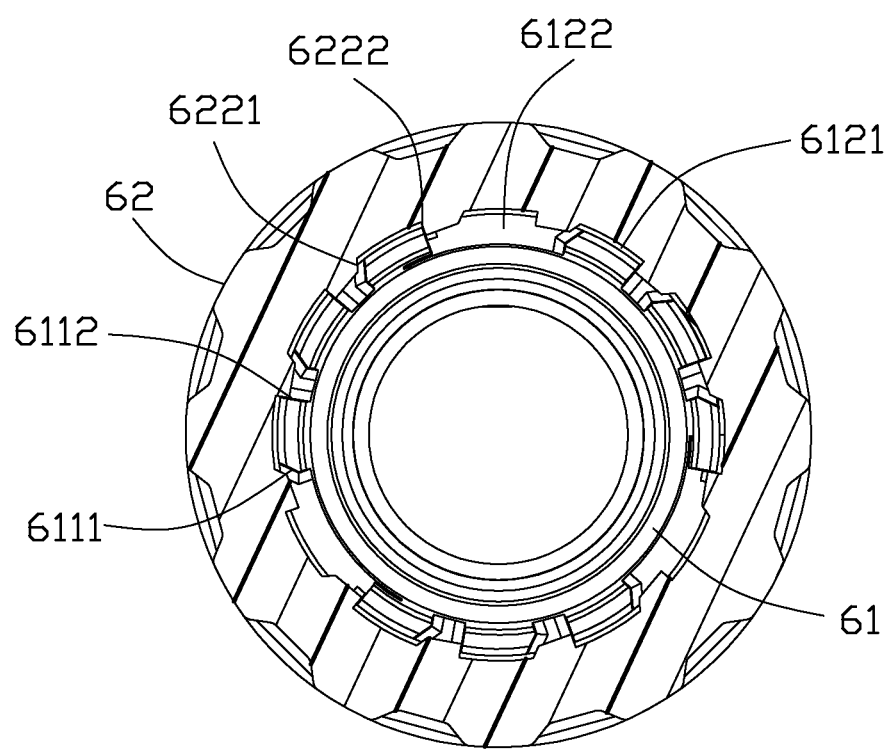
FIG. 5 is a cross section view of the nut matched with the hollow stud.
Figure 6:
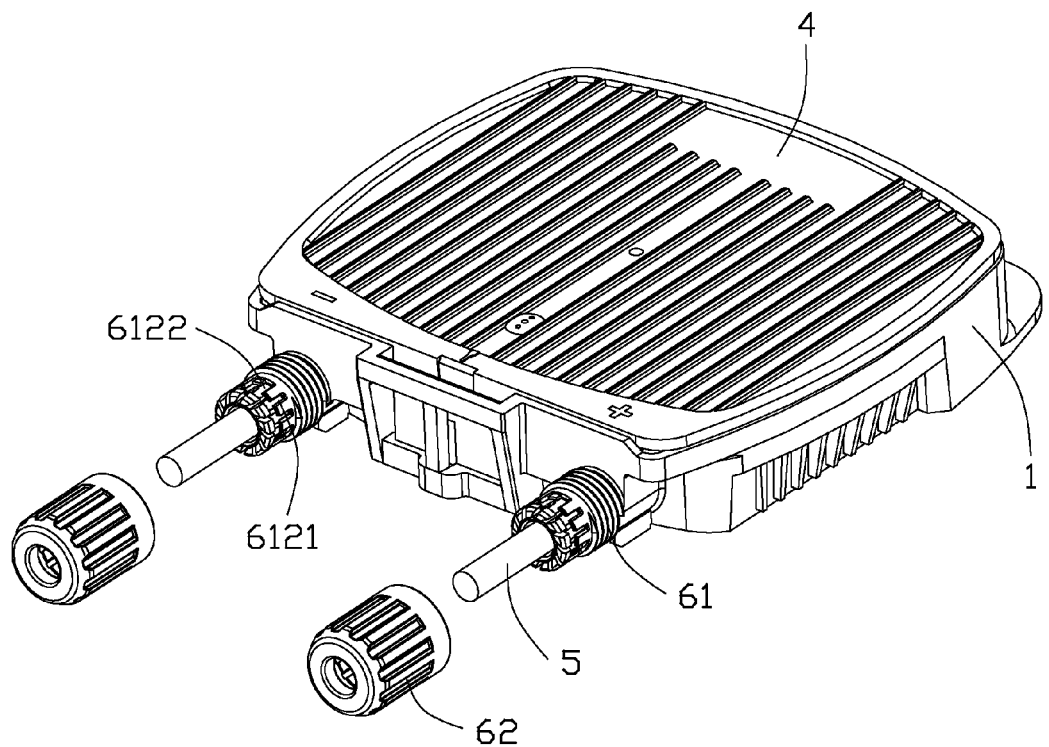
FIG. 6 is a part exploded view of the nut of the PV junction box of FIG. 1.

Please referring to FIG. 5, said elastic plate 611 defines a first side face 6111 used to guide the tubers 622 into the opening 612 and a second side face 6112 opposite to said first side face 6111 abutting against the tubers 622 such that the tubers 622 could rotate over the first side face 6111 in a first direction (clockwise) along the peripheral wall but could not rotate over the second side face 6112 in a second reverse direction opposite to the first direction, Said tubers 622 can only rotate clockwise on the peripheral wall. The second side face 6112 extends perpendicular to an axial direction of the hollow stud 62 and a first side face 6111 slant to the second side face 6112.

Please referring to FIGS. 3 and 7, the cable 5 is received in the hollow stud 61, said screw retaining mechanism 6 further includes a cable seal 63 surrounding an outer wall of the cable 5 and a pinch ring 64 covering an outer wall of the cable seal 63. The hollow stud 61 defines an annular inner surface 613 formed a prevent portion 6131, said cable seal 63 abuts on the preventing portion. The pinch ring 64 defines a base portion 641 has a circular shape and a plurality of retaining arms 642 extending from the base portion 641, a tapered portion (not shown) formed on the inner wall 621 of the nut 62 and said retaining arms 642 are configured to engage the tapered portion. Said tapered portion is used to crimp the retaining arms onto the cable seal 63 for sealing.

The base portion 641 of the pinch ring 64 further includes at least one protruding portion 6411, said opening 612 defines a first opening 6121 and a second opening 6122 to retain the tuber 622 and the protruding portion 6411 respectively. Said protruding portion 6411 is used to prevent the pinch ring 64 rotate following the nut 62.

Please referring to FIGS. 3 and 5, three of the elastic plates formed as a group, said second opening 6122 is formed between two adjacent groups of the elastic plates 611 and the first opening 6121 is formed between two adjacent elastic plates 611 of each group, the width of the second opening 6122 is larger than first opening 6121. The tuber 622 has a rotating side 6221 for mating with the first side face 6121 and a preventing side 6222 opposite to the rotating side, said rotating side parallels to the first side face 6121 and the preventing side parallels to the second side face 6122.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A screw retaining mechanism, comprising:
    a hollow stud having a plurality of elastic plates extending from a free end thereof and along a peripheral wall thereof;
    a nut matched with the hollow stud and an opening is located between two adjacent elastic plates;
    wherein an inner wall of the nut has a plurality of tubers protruding inwardly and extending in an axial direction thereof to match with the opening, said elastic plate defines a first side face used to guide the tubers into the opening and a second side face opposite to said first side face abutting against the tubers such that the tubers could rotate over the first side face in a first direction along the peripheral wall but could not rotate over the second side face in a second reverse direction opposite to the first direction.

2. The screw retaining mechanism according to claim 1, wherein the second side face extends perpendicular to an axial direction of the hollow stud and the first side face slant to the second side face.

3. The screw retaining mechanism according to claim 2, wherein a cable is received in the hollow stud, said screw retaining mechanism further includes a cable seal surrounding an outer wall of the cable and a pinch ring covering the cable seal.

4. The screw retaining mechanism according to claim 3, wherein the pinch ring includes a base portion has a circular shape and a plurality of retaining arms extending from the base portion, said base portion further includes at least one protruding portion, said opening defines a first opening and a second opening to retain the tuber and the protruding portion respectively.

5. The screw retaining mechanism according to claim 4, wherein the hollow stud has an annular inner surface formed a preventing portion, said cable seal abuts on the preventing portion, a tapered portion forms on the inner wall of the nut and said retaining arms are configured to engage the tapered portion.

6. The screw retaining mechanism according to claim 4, wherein three of said elastic plates formed as a group, said second opening is formed between two adjacent groups of the elastic plates and the first opening is formed between two adjacent elastic plates of each group.

7. The screw retaining mechanism according to claim 1, wherein said tuber is formed adjacent to a bottom surface of the nut.

8. The screw retaining mechanism according to claim 1, wherein the tuber has a rotating side for mating with the first side face and a preventing side opposite to the rotating side, the rotating side parallels to the first side face and the preventing side parallels to the second side face.

9. A PV junction box, comprising:
    a screw retaining mechanism having a hollow stud and a nut matched with the hollow stud;
    a box has a bottom wall and four side walls;
    two hollow studs are formed on one of side walls for receiving a cable;
    wherein the hollow stud having a plurality of elastic plates extending from a free end thereof and along a peripheral wall thereof, an opening is located between two adjacent elastic plates, an inner wall of the nut has a plurality of tubers protruding inwardly and extending in an axial direction thereof to match with the opening, said tubers can only rotate clockwise on the peripheral wall.

10. The PV junction box according to claim 9, wherein the second side face extends perpendicular to an axial direction of the hollow stud and the first side face slant to the second side face.

11. The PV junction box according to claim 9, wherein three of said elastic plates formed as a group, said second opening is formed between two adjacent groups of the elastic plates and the first opening is formed between two adjacent elastic plates of each group.

12. The PV junction box according to claim 11, wherein the pinch ring includes a base portion has a circular shape and a plurality of retaining arms extending from the base portion, said base portion further includes at least one protruding portion, said opening defines a first opening and a second opening to retain the tuber and the protruding portion respectively.

13. The PV junction box according to claim 9, wherein said tuber has a rotating side for mating with the first side face and a preventing side opposite to the rotating side, the rotating side parallels to the first side face and the preventing side parallels to the second side face.

14. A junction box including:
    a case defining a wall with a hollow stud extending therethrough rearwardly;
    a cable extending along an interior space of said stud;
    one of an inner thread and an outer thread formed on a thread portion of the said stud;
    a nut coupled to the stud and having a thread portion equipped with the other of said inner thread and said outer thread;
    a plurality of elastic plates circumferentially arranged with one another, each of said elastic plates extending in an axial direction;
    a plurality of tubers circumferentially arranged with one another, each of said tubers extending along said axial direction;
    said elastic plates being applied upon one of said stud and said nut and offset from the corresponding thread portion in said axial direction;
    said tubers being applied upon the other of said stud and said nut and offset from the corresponding thread portion in said axial direction; wherein
    said elastic plates and said tubers are coupled with each other in pairs, each pair defines an slanted lateral side and a upstanding lateral side so as to allow the nut to be rotated upon the stud in one direction with stopper means for preventing backward rotation.

15. The junction box as claimed in claim 14, wherein said nut covers said stud.

16. The junction box as claimed in claim 15, wherein the stud has the outer thread while the nut has the inner thread.

17. The junction box as claimed in claim 16, wherein the elastic plates are formed on the stud while the tubers are formed on an inner surface of the nut.

18. The junction box as claimed in claim 17, wherein the elastic plates are located on a free end of the stud while the tubers are located on a cap side of the nut.

19. The junction box as claimed in claim 18, further including a pin ring to inwardly grasp the cable.

20. The junction box as claimed in claim 19, further including means for aligning the pin ring with regard to the nut without relative rotation therebetween.

\* \* \* \* \*